US007178109B2

(12) United States Patent
Hewson et al.

(10) Patent No.: US 7,178,109 B2
(45) Date of Patent: Feb. 13, 2007

(54) PROCESS/VIEWER INTERFACE (75) Inventors: Darren M. Hewson, Stockton on Tees (GB); James D. St. Jean, Francestown, NH (US); J. Michael Myles, Manchester, NH (US); Michael J. Ruggieri, Jr., New Boston, NH (US)

(73) Assignee: Chordiant Software, Inc., Cupertino, CA (US)

( * ) Notice: Subject to any disclaimer, the term of this patent is extended or adjusted under 35 U.S.C. 154(b) by 155 days.

(21) Appl. No.: 10/639,735

(22) Filed: Aug. 12, 2003

(65) Prior Publication Data

US 2005/0039191 A1 Feb. 17, 2005

(51) Int. Cl.
G06F 3/048 (2006.01)
(52) U.S. Cl. ............... 715/790; 715/802; 715/777; 715/804; 715/792; 715/742
(58) Field of Classification Search ............... 715/781, 715/797, 771, 804, 790, 792, 794, 767, 777, 715/776, 968, 742, 743, 741, 766, 779, 783, 715/788, 841, 854; 707/104.1, 10
See application file for complete search history.

(56) References Cited

U.S. PATENT DOCUMENTS

| 5,586,311 A | 12/1996 | Davies et al. ............... 395/561 |
| 5,675,753 A | 10/1997 | Hansen et al. ............... 395/333 |
| 5,689,663 A * | 11/1997 | Williams ................. 715/771 X |
| 5,831,607 A | 11/1998 | Brooks ........................ 345/333 |
| 5,841,435 A | 11/1998 | Dauerer et al. ............. 345/339 |
| 5,864,865 A | 1/1999 | Lakis ........................ 707/103 |
| 5,892,512 A | 4/1999 | Donnelly et al. ........... 345/349 |
| 5,911,138 A | 6/1999 | Li et al. ......................... 707/3 |
| 6,008,808 A | 12/1999 | Almeida et al. ............. 345/339 |
| 6,108,004 A | 8/2000 | Medl .......................... 345/346 |
| 6,281,896 B1 * | 8/2001 | Alimpich et al. ........... 715/781 |
| 6,282,547 B1 | 8/2001 | Hirsch ........................ 707/102 |
| 6,304,259 B1 | 10/2001 | DeStefano .................. 345/346 |
| 6,313,834 B1 | 11/2001 | Lau et al. .................... 345/343 |
| 6,344,862 B1 | 2/2002 | Williams et al. ............ 345/781 |
| 6,356,286 B1 | 3/2002 | Lawrence ................... 345/853 |
| 6,366,299 B1 | 4/2002 | Lanning et al. ............. 345/738 |
| 6,370,537 B1 | 4/2002 | Gilbert et al. .............. 707/101 |
| 6,380,947 B1 | 4/2002 | Stead ......................... 345/645 |
| 6,421,571 B1 | 7/2002 | Spriggs et al. ................ 700/17 |
| 6,430,571 B1 | 8/2002 | Doan et al. ................. 707/103 |
| 6,430,574 B1 | 8/2002 | Stead ......................... 707/104 |
| 6,446,065 B1 | 9/2002 | Nishioka et al. ............... 707/5 |
| 6,469,715 B1 | 10/2002 | Carter et al. ................ 345/763 |
| 6,469,716 B1 | 10/2002 | Carter et al. ................ 345/763 |

(Continued)

Primary Examiner—Raymond J. Bayerl
(74) Attorney, Agent, or Firm—McLane, Graf, Raulerson & Middleton, PA (57) ABSTRACT A user interface for viewing reference data associated with a conceptual entity and for execution of one or more complex processes for manipulating the data includes a process panel having one or more on-screen objects for the execution of the complex processes and a process work area for displaying a state of selected complex processes. A data viewer includes a content pane for the display of the reference data and one or more on-screen objects for selectively displaying at least a portion of the reference data and the process panel and data viewer are framed within a common window. The process panel and data viewer are selectably viewable and occupy overlapping positions within the common window.

33 Claims, 8 Drawing Sheets

U.S. PATENT DOCUMENTS

| | | | |
|---|---|---|---|
| 6,493,731 B1 | 12/2002 | Jones et al. | 707/501.1 |
| 6,529,217 B1 | 3/2003 | Maguire, III et al. | 345/769 |
| 6,529,900 B1 | 3/2003 | Patterson et al. | 707/3 |
| 6,532,474 B2 | 3/2003 | Iwamoto et al. | 707/104.1 |
| 6,546,381 B1 | 4/2003 | Subramanian et al. | 707/2 |
| 6,556,226 B2 | 4/2003 | Gould et al. | 345/850 |
| 6,559,864 B1 | 5/2003 | Olin | 345/762 |
| 6,597,381 B1 * | 7/2003 | Eskridge et al. | 715/804 |
| 6,925,609 B1 * | 8/2005 | Lucke | 715/804 |
| 6,966,033 B1 * | 11/2005 | Gasser et al. | 715/771 X |
| 2002/0070972 A1 * | 6/2002 | Windl et al. | 715/777 |
| 2002/0093537 A1 * | 7/2002 | Bocioned et al. | 715/777 |
| 2002/0120627 A1 * | 8/2002 | Mankoff | 707/10 |
| 2003/0001894 A1 | 1/2003 | Boykin et al. | 345/764 |
| 2004/0162812 A1 | 8/2004 | Lane et al. | 707/3 |

* cited by examiner

PROCESS/VIEWER INTERFACE

FIELD OF THE INVENTION

The present invention relates generally to a graphical user interface and, more particularly, to a combined process interface and data viewer interface ("process/viewer interface" or "PVI") that allows users, in a single window, to (1) execute and display one or more complex processes against some conceptual object or entity represented in software, and (2) to view reference data related to that conceptual object in an data viewer mechanism.

Unless indicated otherwise, the term "conceptual object" as used herein refers not to a data object, but to a conceptual entity that can be represented in a software model and has properties or characteristics that may need to be interrogated, and has associated processes that may be run against it. In a preferred aspect, the present invention finds particular application for use in connection with software for customer call centers or other points of customer contact such as retail branch outlets, mobile settings such as field agent environments, shipping, delivery, sales, service, route settings, e.g., wherein the conceptual objects represented in software are the customers. The present invention may also be employed with customer self-service sites, such as web-based or other remotely accessible sites. However, the present invention is not limited to any particular application type and the conceptual entities or objects are not limited to customers, but may be any items that can be managed by a software application, such as individual vehicles in a rental fleet, individual departments within a business enterprise, buildings under common management, and the like.

BACKGROUND OF THE INVENTION

Typically, software applications tend to use either a single document interface (SDI) or multiple document interface (MDI) approach. Under the SDI approach, an application allows for the display of only one document at a time. An application employing an SDI requires additional instances of the application be opened to work with additional documents. Under an MDI approach, an application allows for the display of more than one document at once.

A significant disadvantage of MDI or dialog window dependent systems resides in the inconsistency of control and data location. A given dialog or sub window is unlikely to consistently open in the same location relative to the calling window. There are too many variables around parent window location, size, screen resolution, and the like. Even if the location of the related windows were relatively consistent when first open, the user may move, resize, or reorder them in the z axis at anytime, potentially making them more difficult to locate later. When multiple MDI windows must be referenced repeatedly, as in viewing reference data in one while working in another, it becomes awkward for the user to work efficiently and can be confusing.

Both the SDI and MDI approaches often additionally make use of dialogs to encapsulate complex processes, such as configuring the work environment, editing formulas, and editing style settings to name but a few. Such dialogs are generally modal, i.e., they lock out interaction with the calling window. In contrast, a non-modal dialog is a separate window launched from an application window that does not limit access to the parent window, and is generally used to run a related process. Modal dialogs have generally been used because of the difficulties inherent in management of non-modal dialogs that impact the calling parent window.

Accordingly, the present invention provides a user interface for a computer or other information handling system that provides for simultaneous execution of complex processes and viewing of reference data in a single window which overcomes the above problems and others.

SUMMARY OF THE INVENTION

In a first aspect, a user interface for viewing reference data associated with a conceptual entity and for execution of one or more complex processes for manipulating the data includes a process panel having one or more on-screen objects for the execution of the complex processes and a process work area for displaying a state of selected complex processes. A data viewer includes a content pane for the display of the reference data and one or more on-screen objects for selectively displaying at least a portion of the reference data and the process panel and data viewer are framed within a common window. The process panel and data viewer are selectably viewable and occupy overlapping positions within the common window.

In a second aspect, a combined data viewer and data processing system for use with a computer-based information handling system is provided. The information handling system includes a display device that displays on a screen of the display device a user interface for viewing and acting upon a single conceptual entity. The combined data viewer and data processing system includes a process panel comprising a first region including a list of available and/or currently running processes for the manipulation of data associated with the conceptual entity, and a second region comprising a process work area for the display of the state of a selected process and/or receiving user input. A data viewer comprises a content pane for the display of data associated with the conceptual entity.

In a third aspect, a computer-based information handling system for the display of one or more complex processes and reference data in a single window for a conceptual entity represented in software is provided. The system includes a processor for executing a program of instructions on the information handling system, a memory coupled to the processor for storing the program of instructions executable by the processor, and a display system is coupled to the processor. The program of instructions configures the information handling system to display a user interface comprising a process panel and a data viewer. The process panel includes one or more on-screen objects for the execution of the complex processes and a process work area for displaying a state of selected complex processes. The data viewer comprising a content pane for the display of the reference data and one or more on-screen objects for selectively displaying at least a portion of the reference data. A common window frames the process panel and data viewer and the process panel and data viewer are selectably viewable and occupy overlapping positions within the common window.

In a fourth aspect, a user interface (UI) for viewing reference data associated with a conceptual entity and for execution of one or more complex processes for manipulating the data comprises a process panel for executing one or more complex processes and displaying a state of the one or more complex processes. The UI also includes a data viewer for the display of reference data and a common window containing the process panel and the data viewer. The process panel and data viewer are arranged in an overlapping and individually selectable manner within the common window.

In a fifth aspect, a system for generating a combined process and data viewer interface is provide, comprising a client computer system connected to a network and a server computer system connected to the network, the network interconnecting the client computer system and the server computer system. A program of instructions comprising a user interface running on at least one of the server computer system and the client computer system, the user interface comprises a process panel for executing one or more complex processes and displaying a state of the one or more complex processes and a data viewer for the display of reference data. A common window contains the process panel and data viewer. The process panel and data viewer being arranged in an overlapping and individually selectable manner within the common window.

In a sixth aspect, a method for the display of one or more complex processes and reference data in a single window is provided. The one or more complex processes and reference data are associated with a conceptual entity represented in software. The method comprises opening a common window and displaying a process panel within the common window. The process panel includes one or more on-screen objects for the execution of the complex processes and a process work area for displaying a state of selected complex processes. A data viewer is displayed, comprising a content pane for the display of the reference data and one or more on-screen objects for selectively displaying at least a portion of the reference data. The process panel and data viewer are selectably viewable and occupying overlapping positions within the common window.

In a seventh aspect, a computer readable medium is provided whose contents cause a computer to perform method steps for the display of one or more complex processes and reference data in a single window. The one or more complex processes and reference data are associated with a conceptual entity represented in software. The method steps comprise opening a common window and displaying a process panel within the common window. The process panel comprises one or more on-screen objects for the execution of the complex processes and a process work area for displaying a state of selected complex processes. A data viewer is displayed comprising a content pane for the display of the reference data and one or more on-screen objects for selectively displaying at least a portion of the reference data. The process panel and data viewer are selectably viewable and occupy overlapping positions within the common window.

One advantage of the present invention is that it organizes all the reference data and processes for a conceptual object in a single window, thereby greatly reducing screen clutter as compared with both MDI and SDI applications. MDI applications require multiple documents and dialog windows to achieve the same result and SDI applications require multiple application instances and dialog windows. However, it will be recognized that that the PVI windows of the present invention may themselves appear in SDI or MDI style container applications.

Another advantage of the present invention resides in its simplified window management. The PVI design of the present invention organizes all the data and features, requiring multiple windows in most applications, into a single window, thus simplifying window management.

The present invention also elegantly manages the complexities inherent in viewing and managing nuances of intricate conceptual objects. Since it does so in a way that only requires a single application or document window, the present invention also lends itself to thin client web applications, where window and state management are significantly more difficult than in the traditional client/server environment.

Yet another advantage of the present invention is that it provides for a consistent location of on-screen controls and data. With the present PVI design the relative location of all controls and screens remains constant. Even if resized, the location of each item positions itself in a manner consistent with the change in window resolution. Thus, once a user learns the location of an item within the PVI he or she can safely habituate on that location since it will always be reinforced. In a multi-window approach the user must consciously search for items every time. This reduces productivity and creates greater potential for error. Control location consistency is a major usability and productivity advantage to the PVI design.

Still further advantages and benefits of the present invention will become apparent to those of ordinary skill in the art upon reading and understanding the following detailed description of the preferred embodiments.

It is to be understood that both the foregoing general description and the following detailed description are exemplary and explanatory only and are not restrictive of the invention as claimed. The accompanying drawings, which are incorporated in and constitute a part of the specification, illustrate presently preferred embodiments of the invention and, together with the general description given above, and the description of the preferred embodiments given below, serve to explain the principles of the invention.

BRIEF DESCRIPTION OF THE DRAWINGS

The following is a brief description of each drawing used to describe the present invention, and thus, are being presented for illustration purposes only and should not be limitative of the scope of the present invention, wherein:

FIG. 8 depicts an exemplary data viewer page in a customer profile context; and

DETAILED DESCRIPTION OF THE PREFERRED EMBODIMENTS

Figure 1:
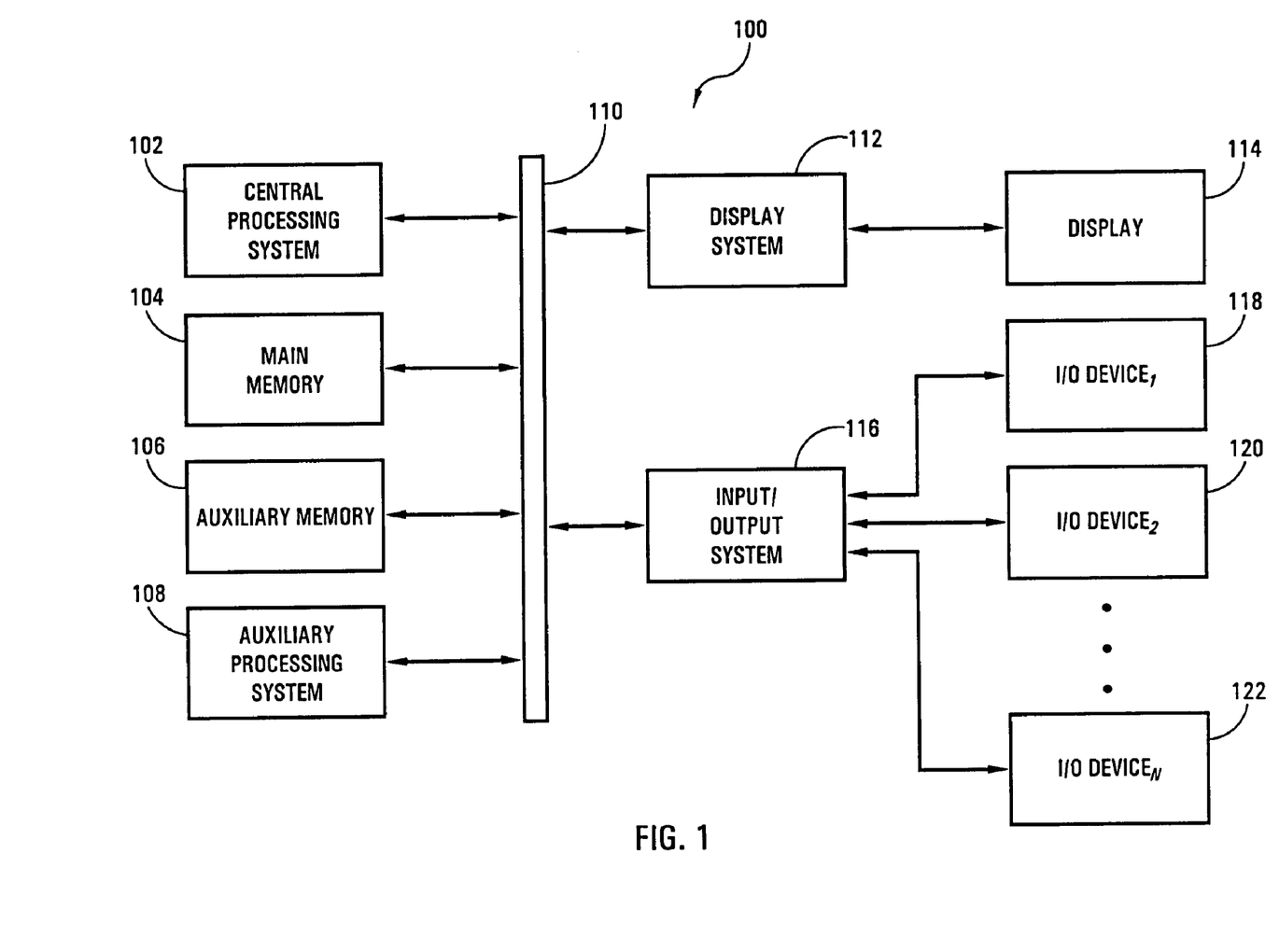
FIG. 1 is a block diagram of a hardware system generally representative of a computer-based information handling system of a type operable to embody the present invention.

Referring now to FIG. 1, an information handling system operable to embody the present invention is shown. The hardware system 100 shown in FIG. 1 is generally representative of the hardware architecture of a computer-based information handling system of the present invention, such as the client computer system 912 or the server computer system 940 of the networked system 900 shown in FIG. 9. The hardware system 100 is controlled by a central processing system 102. The central processing system 102 includes a central processing unit such as a microprocessor or microcontroller for executing programs, performing data manipulations and controlling the tasks of the hardware system 100. Communication with the central processor 102 is implemented through a system bus 110 for transferring information among the components of the hardware system 100. The bus 110 may include a data channel for facilitating information transfer between storage and other peripheral components of the hardware system. The bus 110 further provides the set of signals required for communication with the central processing system 102 including a data bus, address bus, and control bus. The bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 100 include main memory 104, and auxiliary memory 106. The hardware system 100 may further include an auxiliary processing system 108 as required. The main memory 104 provides storage of instructions and data for programs executing on the central processing system 102. The main memory 104 is typically semiconductor-based memory such as dynamic random access memory (DRAM) and/or static random access memory (SRAM). Other semi-conductor-based memory types include, for example, synchronous dynamic random access memory (SDRAM), double data rate (DDR) SDRAM, Rambus dynamic random access memory (RDRAM), ferroelectric random access memory (FRAM), and so on. The auxiliary memory 106 provides storage of instructions and data that are loaded into the main memory 104 before execution. The auxiliary memory 106 may include semiconductor based memory such as read-only memory (ROM), programmable read-only memory (PROM), erasable programmable read-only memory (EPROM), electrically erasable programmable read-only memory (EEPROM), or flash memory (block oriented memory similar to EEPROM). The auxiliary memory 106 may also include a variety of nonsemiconductor-based memories, including, but not limited to, magnetic tape, drum, floppy disk, hard disk, optical laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well. The hardware system 100 may optionally include an auxiliary processing system 108 which may include one or more auxiliary processors to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 100 further includes a display system 112 for connecting to a display device 114, and an input/output (I/O) system 116 for connecting to one or more I/O devices 118, 120, up to N number of I/O devices 122. The display system 112 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like.

The display device 114 may comprise a cathode ray-tube (CRT) type display such as a monitor or television, or may comprise an alternative type of display technology such as a projection-type display, liquid-crystal display (LCD), light-emitting diode (LED) display, gas or plasma display, electroluminescent display, vacuum fluorescent display, cathodoluminescent (field emission) display, plasma-addressed liquid crystal (PALC) display, high-gain emissive display (HGED), and so forth.

The input/output system 116 may comprise one or more controllers or adapters for providing interface functions between the one or more I/O devices 118-122. For example, the input/output system 116 may comprise a serial port, parallel port, integrated device electronics (IDE) interfaces including AT attachment (ATA) IDE, enhanced IDE (EIDE), and the like, small computer system interface (SCSI) including SCSI-1, SCSI-2, SCSI-3, ultra SCSI, fiber channel SCSI, and the like, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, track ball, touch pad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, etc. The input/output system 116 and I/O devices 118-122 may provide or receive analog or digital signals for communication between the hardware system 100 of the present invention and external devices, networks, or information sources. The input/output system 116 and I/O devices 118-122 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 100 of FIG. 1 by one having ordinary skill in the art would not depart from the scope or the spirit of the present invention.

Figure 2:
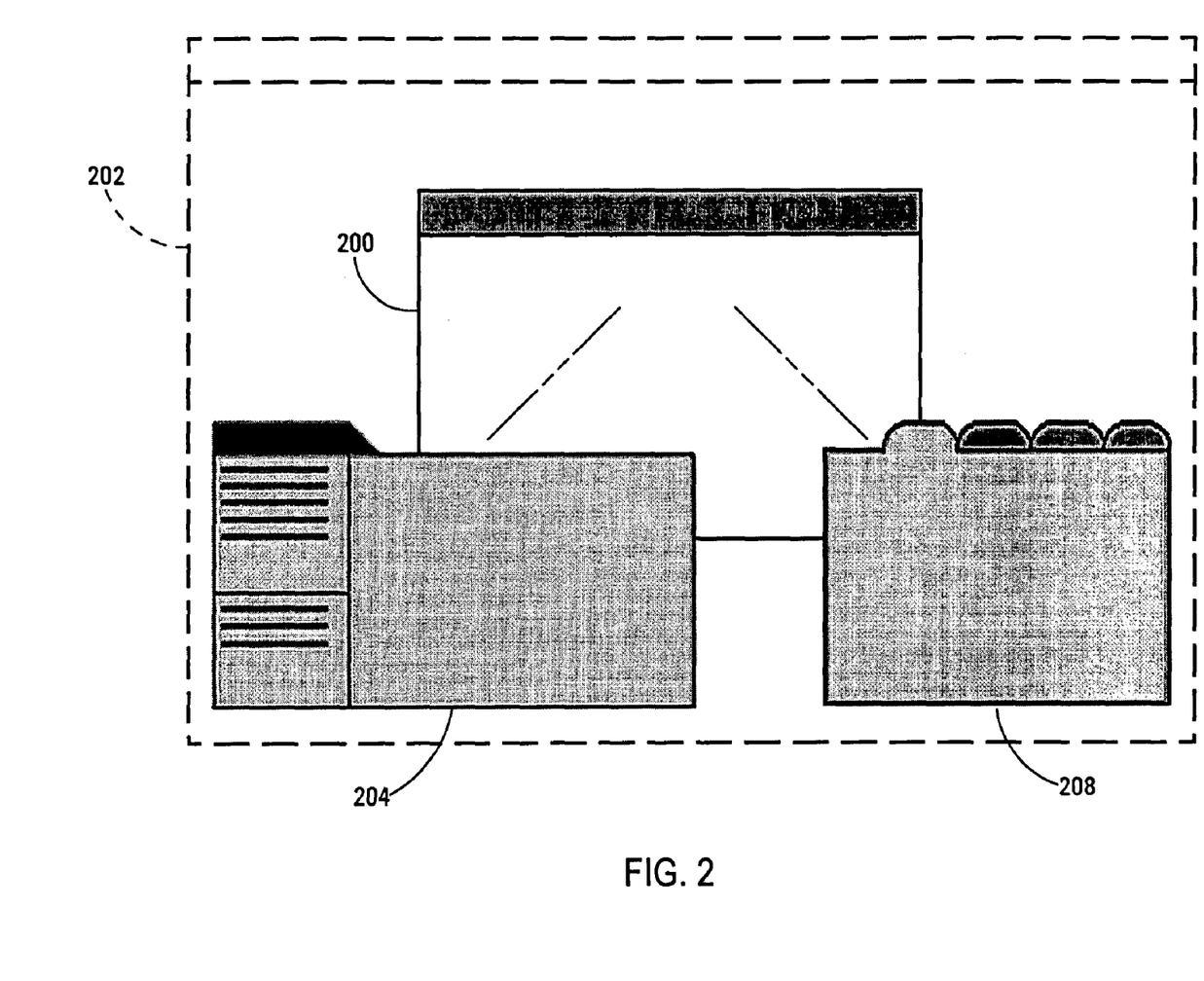
FIG. 2 is an exploded view of an exemplary screen layout incorporating the combined process and data viewer interface in accordance with the present invention.

With reference now to FIG. 2, there is shown an exemplary screen layout of an application interface in accordance with the present invention. A common window 200 is dedicated to a single conceptual entity that is represented in software.

Although the PVI in accordance with this teaching is generally used to view and act upon a single conceptual object or entity, it will be recognized that this is not to say that it acts only on a single data object in the UML/programming sense, but rather a single entity from the perspective of an application's conceptual model. For example, in the case of customer call center software, the conceptual entity or object represented and acted upon is a single customer. In the data model, the information displayed in the PVI or conceptual customer may actually come from a host of data objects in the application, not just the customer data object. However, from the perspective of the user interface, customer is a single entity type. Thus, the PVI is tailored to be used to view and process conceptually related information, regardless of how that information may be represented in the application's data model.

The window 200 may be a single, stand alone application window, for example, wherein multiple conceptual objects would be displayed in a separate window 200, each representing a separate instance of the application. That is, the window 200 can be the application window itself, managed by the host desktop. Alternatively, the window 200 could be handled as a window residing within a containing application window 202 (shown in broken lines) and may be managed through standard window management paradigms (min, max, close, tile, etc.).

Multiple common windows 200 may be provided for multiple objects. In the case of a common window 200 which is a main application window, the simultaneous display of multiple conceptual objects can be handled as multiple instances of the application. In the case where the common window 200 resides within a single main application window 202, multiple conceptual objects are handled as multiple windows 200 displayed within the single containing application window 202.

The common window 200 contains a process panel 204 and data viewer 208. The common window 200, process panel 204, and data viewer 208 are shown in exploded view for ease of exposition, although in operation the process panel 204 and data viewer 208 are contained within the window 200 in overlapping manner, e.g., in fixed relative position therein. Each may selectively be brought into a viewable or forefront position by a user (i.e., by moving or shifting focus along a z-axis extending in the direction normal to the plane of the display), e.g., using an on-screen pointing device, keyboard command, etc.

The essential purpose of the common window framework 200 is to contain the process panel 204 and data viewer 208 elements. As the outer window frame, it may host all window management related features (minimize, maximize, close, etc.). Additionally, it may host global features that affect the entire PVI. Such features may include, for example, menus, toolbars, static text, inputs, controls, or any other component that conceptually needs to work on a global level to the PVI, and not solely in the context of the process panel or data viewer components alone.

The present invention combines, in the single common window 200, the process panel 204, which provides an interface which allows complex, multi-step processes to be executed, and an independent viewer mechanism 208. In addition to the process panel 204 and data viewer 208, the common window 200 and the main application window 202 (if present) may additionally contain various title and status bars, pull down menus, tool bars, scroll bars, and various other control buttons or switches, e.g., for window closing or resizing, or performing other functions, or other text, information, indicia, components, or controls that are desired to be available and visible at all times, regardless of the particular process or data item in focus.

The present invention essentially blends aspects of SDI, MDI, and non-modal dialogs into a single component. The PVI encapsulates process features generally associated with dialogs into a single window 204, which greatly simplifies window management for processes and reduces screen clutter. The management of processes in the process panel 204 has many features exhibited by the use of non-modal dialogs. The non-modal dialogs of the present invention run complex processes, however, their non-modal nature allows the user to return to the parent window and continue to work there, if desired. By combining the process viewer 204 and the data viewer 208, the present invention overcomes the problems associated with the asynchronous use of document interfaces and dialogs and the difficulty of keeping track of the resulting windows and correctly transferring control of and properly updating object data. The present invention also allows navigation between and sorting of non-modal dialogs related to a given parent document window.

The use of a single window in accordance with this teaching is particularly advantageous with regard to usability, since it maintains a relative location of controls within an object. This is analogous to an SDI approach in that there is a single PVI window. However, as noted above, the PVI design can alternatively be implemented as a document window within an application. In such an implementation each PVI instance 200 would be a document interface within an MDI window 202.

Figure 3:
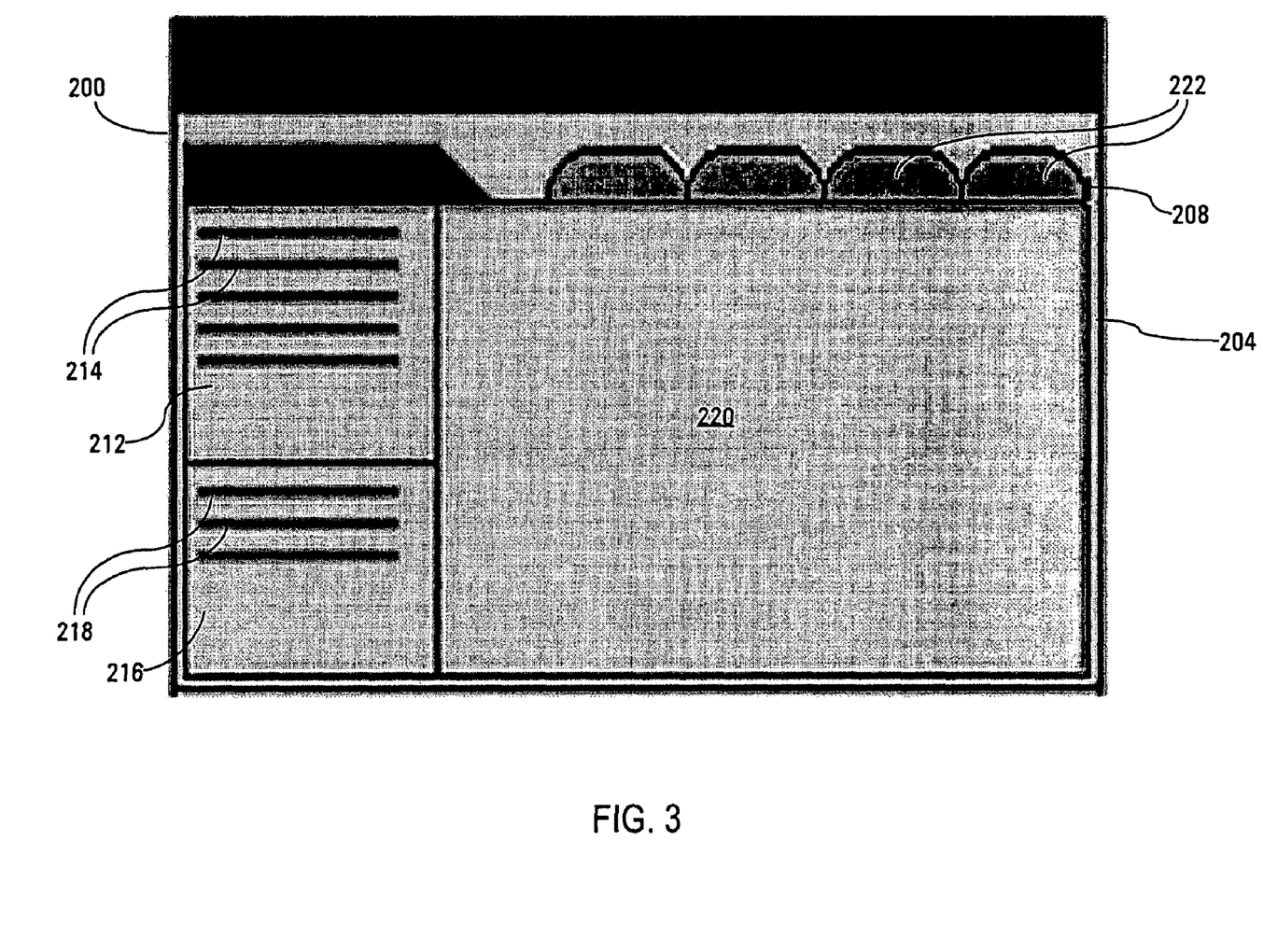
FIG. 3 illustrates the process viewer interface of the present invention wherein the process pane is in focus.

With reference now to FIG. 3, there is shown a common window 200 wherein the process panel 204 is focus, and wherein the data viewer 208 is in the background. The process panel 204 is the primary point of contact for editing (creating, updating, or deleting) data for the object that requires a complex process.

In the depicted embodiment, the process panel 204 includes a first region 212 containing a list or series of available processes 214 which may be run against the conceptual object represented by the common window 200. Such processes may be multi-step processes that may be passed on to others for further input. The process panel 204 also includes a second region 216 containing a list of currently running processes 218. The process panel 204 further includes a third region 220, which is a process work area. The process work area 220 will change in accordance with the particular process selected and may provide a means for the entry of user input, for example, via windows or text boxes, on-screen buttons, one or more interactive prompts or dialog boxes, on-screen questionnaires, software wizards, or the like, to guide the user through the selected process.

The process panel 204 and data viewer 208 occupy the workspace of the common window framework 200 in such a way that the available and current process lists 212 and 216 are visible when the data viewer 208 is selected or brought to fore, so as to afford immediate access to the processes 214 and 218 at any point.

In operation, the selection of an available process 214, e.g., with an on-screen pointer, within the available process region 212 will begin execution of the selected process 214 within the window 220. Upon selection of a currently running process 218 within the window 216 (or, in the event a selected process 214 is also a currently running process), the contents of the process work area 220 will be updated to reflect current state of execution of the selected process 214.

Figure 5:
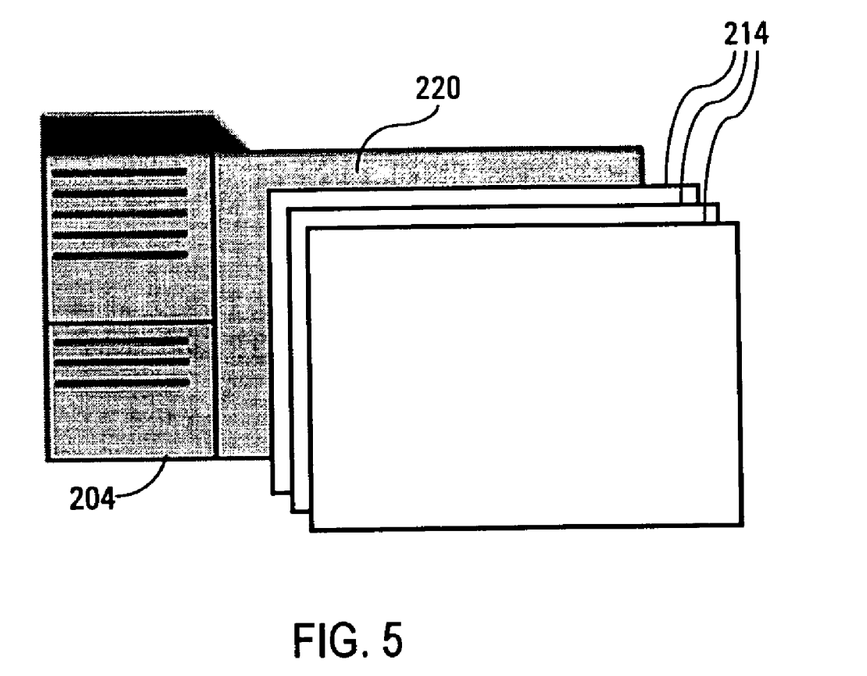
FIG. 5 is an exploded view of the process panel.

The conceptual arrangement of the process window 220 as a plurality of selectable process pages or screens is illustrated in FIG. 5. Multiple processes may reside in the work area 220 of the process panel. Navigation between processes if afforded by selecting (e.g., by clicking with an on-screen pointing device) a process from the current process list to bring it into focus in the process panel work area 220.

The process panel 204 is used to run complex processes against the conceptual object or entity represented by the PVI. These are potentially multi-step processes that may be passed on to others for further input. For example, where the PVI is used to represent a customer in the system, a user may choose to run a process such as "Apply for Loan." This process may be started by a phone representative who gathers all the pertinent information over the course of one or more input pages. Upon completion, that process would then be routed to other users in the system with authorization to review and approve loan applications.

Alternatively, a process may be fully completed by the user who initiates it, but the complexity and dependencies of the process may require that it be run as a process, and not simply handled through inline editing. Returning to the above example, a process such as "Open New Account" could be run by an agent on behalf of a customer, but since opening a new account (e.g., with a financial institution) requires several steps (e.g., selecting the type of account, account number generation, opening balance, ATM card ordering, setting of PIN, to name a few). Since each step may be dependent on those run previously, such processes do not lend themselves to direct data manipulation, as would adding a note about a transaction.

As seen, the process panel 204 is well-suited to handling complex input and data processing procedures. Thus, the PVI of the present invention is designed to address the problems inherent in viewing and managing data related to an object that may require complex processes to be run against it.

The available process list portion 212 of the process panel 204 lists all the processes that may be run for the entity represented by the PVI. Selecting a process 214 to run in the available process list will add that process to the current process list 216. Controls used to facilitate selection of processes from the available list, though not mandated by the PVI architecture, may be provided, e.g., in the form of link text or buttons in most applications, allowing for quick (e.g., single-click) selection.

It may often be the case that the available processes need to vary depending on a given users access rights, system configuration, or other parameter. Thus, the available process list 212 may be implemented in a manner that affords dynamic definition of processes.

The current process list 216 of the process panel lists all processes 218 run or currently running in a given session. Preferably, the current process list 216 provides the run or running processes 218 in chronological order. As processes 214 are selected from the available process list 212 they are added to an end of the current process list. Preferably, selected processes are added to the bottom or end of the list, such that the first or top process in the current list region 216 is the first one that was selected from the available list; the second process in the current list 216 is the second available process selected; and so on. In this way they user can see the order in which processes where started at a glance. However, alternative orderings of the list items 218, such as reverse chronological listing, are also contemplated.

In a further aspect, the current process panel 216 may also include indicia which shows the process state for each of the list items 218. Such states may includes, for example, active, completed, saved, and so forth. The indicia indicating process state may be any associated visual indicator of state. This may be done, for example, through the use of icons, color changes, special characters, font or font style, or similar methods, used alone or in combination.

Processes 218 in the current process panel 216, like those in the available process list are not limited in the selection controls they may use, but both the available and current process lists preferably employ generally the same, or similar controls (such as link text or buttons). Selecting a process 218 in the current process list 216 has the effect of bringing focus to the selected process in the process pane 204. Thus, if the data viewer 208 is in focus when a given current process list item 218 is selected, the data viewer loses focus and the process pane 204 comes to the fore with the selected process in the process work area 220. If the process panel is already in focus, the current contents of the process panel work area 220 are replaced with the selected process.

In addition to allowing for selection, items 218 in the current process list should preferably employ a mechanism to show selection. For instance, if there is a list of four processes 218 in the current list and one is actively in focus, that in-focus process list item should be highlighted or emphasized in some manner or provides with an associated icon or other on-screen indicia. In operation, the current process list 218 is very similar to a tab control serving to bring to the fore a selected one of a number of pages in the process work area 220. This conceptualization of the current process list items 218 as pages which are individually selectable is illustrated in FIG. 5. Thus it is desirable to provide some visual representation of the selected versus unselected processes 218 in the current process list area 216.

If at any point a user chooses to switch focus from the data viewer 208 to the process panel 204 directly (i.e., not selecting a specific process 218 in the list 216, but simply selecting the top level process panel 204) the current process indicated as selected in the list will preferably be brought into focus and appear in the process panel work area 220 when the process panel 204 is brought to the forefront. In keeping with that behavior, if a given process 218 is shown as selected in the current process list 216, switching focus to the data viewer 208 will preferably not cause the process list item to become deselected and change to an unselected appearance in the list.

When a process is selected from the available process list 212, it is preferably added to the end of the current process list in region 216. However, the resultant appearance of the process work area 220 as a result of the selection, i.e., whether the process work area 220 is immediately to show the selected process, may be handled in a number of ways.

For example, in the simplest case where no processes have yet been selected and the current process list is empty, selecting a process 214 from the available list 212 will add it to the current list 216 and bring focus to the process panel with the process visible in the process work area 220.

In another situation, where an active process is not in focus, the behavior will be the same, namely, selecting a process 214 from the available list 212 will add it to the current list 216 and bring that selected process into view in the work area 220. This may occur, for example, in situations where a process 214 is selected from the available list 212 when the data viewer 208 or an inactive process (e.g., a process in completed state) is in focus.

If an active process is in focus and another process is selected from the available list 214, the new process is likewise added to the current list. In certain embodiments, the process work area 220 may be updated to reflect the selected process in all cases. However, preferred embodiments, in such cases where an active process is in focus and another process is selected, it is preferable that focus not be immediately switched away from the active process to the newly selected one. This preference is based on the presumption that while actively engaged in a complex task, a user generally will not want focus shifted from that task unless they explicitly instruct the system to shift focus.

Rather than lose context of the current process, the PVI will preferably queue up the newly selected process for execution at some later time of the users choosing, e.g., by subsequent selection from the list 216 after it has been added thereto.

In many situations it may be desirable that all current processes be in a non-active state (i.e. complete, canceled, differed, saved, etc.) before the PVI is closed. Thus, in certain embodiments, the PVI system of the present invention can handle moving processes from an active state to a non-active state, e.g., automatically under preprogrammed control, or, by forcing the user to do so manually prior to shutdown or closing of a PVI common window 200, for example, through the use of on-screen prompts or the like.

The process work area 220 of the process panel is where the user interfaces of the individual processes are displayed. The process work area 220 occupies the same screen real estate in the PVI common window 200 as does the data viewer 208. Thus, the user may switch between viewing reference data or a process.

While the process work area 220 provides the area where current process user interfaces are displayed, there may be cases where there are no current processes, i.e., there are no processes 218 listed in the current process list 216. Thus, the case where no processes have yet been selected and the current process list is empty can be handled in a number of ways. For example, the system could display the data viewer 208 and disable the ability to shift focus to the process panel 204 until such time as a process is selected. Alternatively, a process panel default or base page could be displayed in the process panel 204 in the absence of any current processes. For example, if there is global data for the process panel 204 that is desired to be displayed or made available for display, a process panel base page may be a logical place for such information to reside. For example, when the conceptual entity is a customer, a process panel base page may be provided to display process history information about the customer.

In embodiments wherein a process panel base page is provided, it is desirable that such page also be made available and viewable even after processes are selected from the available process list 212 and appear on the current process list. Thus, an icon, button, text link, or the like may be provided in either or both of the regions 212 and 216 for navigating to the process panel base page. Alternatively, clicking in region 212 or 216 without clicking directly on an available process or current process list item, i.e., in the background of such regions, could bring up such a process panel base page. Of course, such a page could also or alternatively be made accessible through a keyboard command, pull down menu, context menu, or the like.

Figure 4:
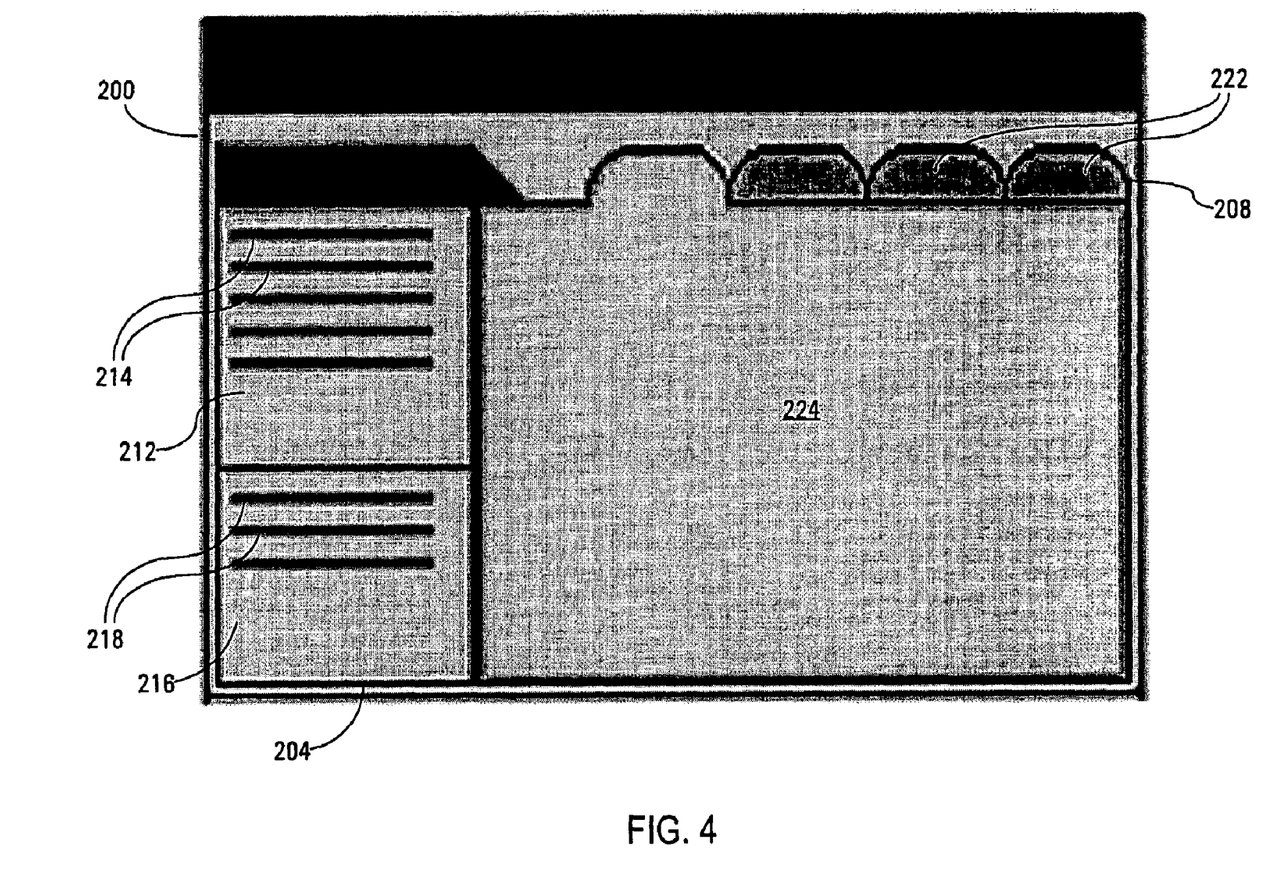
FIG. 4 illustrates the process viewer interface of the present invention wherein the data viewer pane is in focus.

The data viewer 208 includes one or more data pages having user-selectable regions 222 extending beyond the bounds of the process viewer panel 204 that, when selected (e.g., using an on-screen pointing device), brings the data viewer 208 into focus, as shown in FIG. 4. In the depicted embodiment, the user-selectable regions 222 are selectable tabs, which are particularly advantageous where data is contained on multiple pages in that each of the pages is readily selectable by the user.

In reference to FIG. 4, the display viewer 208 is shown in the viewable, forefront position, with the process viewer 204 behind the viewer 208. It will be noted, however, that the available and current list regions 212 and 214 extend outside the bounds of the data viewer 208. Thus, the process panel 204, as well as a particular available process 214 or currently running process 218, may be selected at any time, even when the data viewer 208 is in focus.

Figure 6:
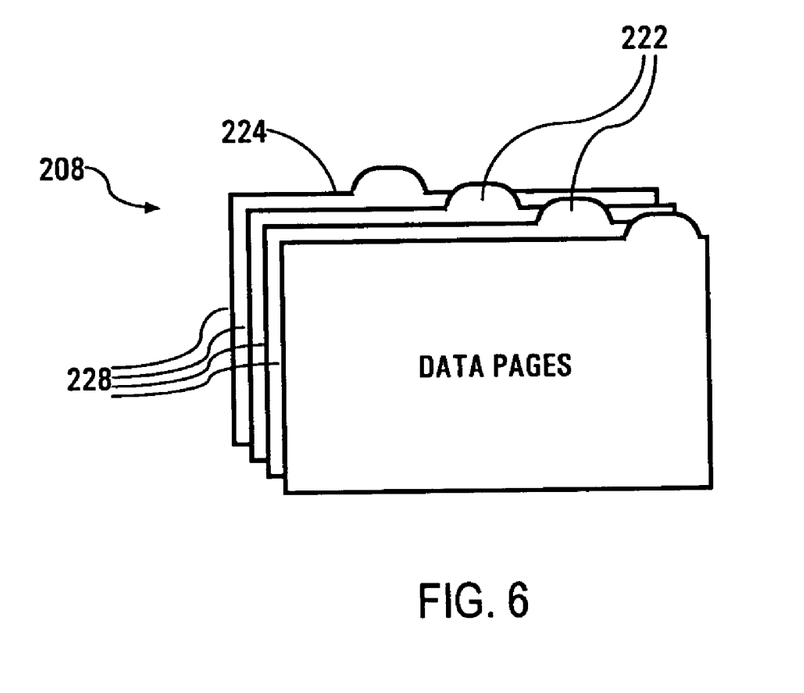
FIG. 6 is an exploded view of the data viewer panel.

The data viewer 208 is the prime point of contact for viewing information on an object. The viewer 208 may advantageously be broken down into logical categories of information organized via the tab interface. The data viewer 208 includes multiple tabs 222 for providing access for multiple pages 224 of data. The tabs 222 may further include indicia thereon indicating a logical category of data. A preferred arrangement of the data viewer 208 as a plurality of tabbed pages of data is illustrated in FIG. 6.

Although the user-selectable on-screen objects are depicted as multiple tabs 222 in the illustrated embodiment, it will be recognized that on-screen objects are contemplated as well, such as buttons, radio buttons, lists, check boxes, and so forth. Also, it is preferred that the tabs 222 (or other on-screen object) provide some indicia for visually differentiating between the currently selected page of data and the non-selected page(s) of data. Likewise, it is preferred that the on-screen indication of the selected data page be retained when the process panel is selected and brought to the forefront.

The data pages 224 may serve as a place holder for any mechanism desired to view reference data. The data to be viewed is generally static in nature, although direct editing or manipulation of data displayed in the data viewer is also contemplated, e.g., via inline editing of the data in the viewer, particularly for changes not requiring a complex process.

The data viewer component of the PVI is what a user may interrogate reference information on the represented object. The exact nature of the data viewer will depend greatly on the application requirements and data set being viewed. The depicted embodiment makes use of a multi-tabbed data viewer. In the case of the conceptual entity being a customer, as shown in FIG. 8, each tab represents a category of information for the customer, such as summary, history, accounts, and so forth. Thus, each tab may vary in its features and presentation based on the needs of the data it organizes. For example, history and accounts may be equipped with powerful search, sort, and filter controls, whereas the summary tab contains simple tables of data that require no search or sort capabilities.

Figure 7:
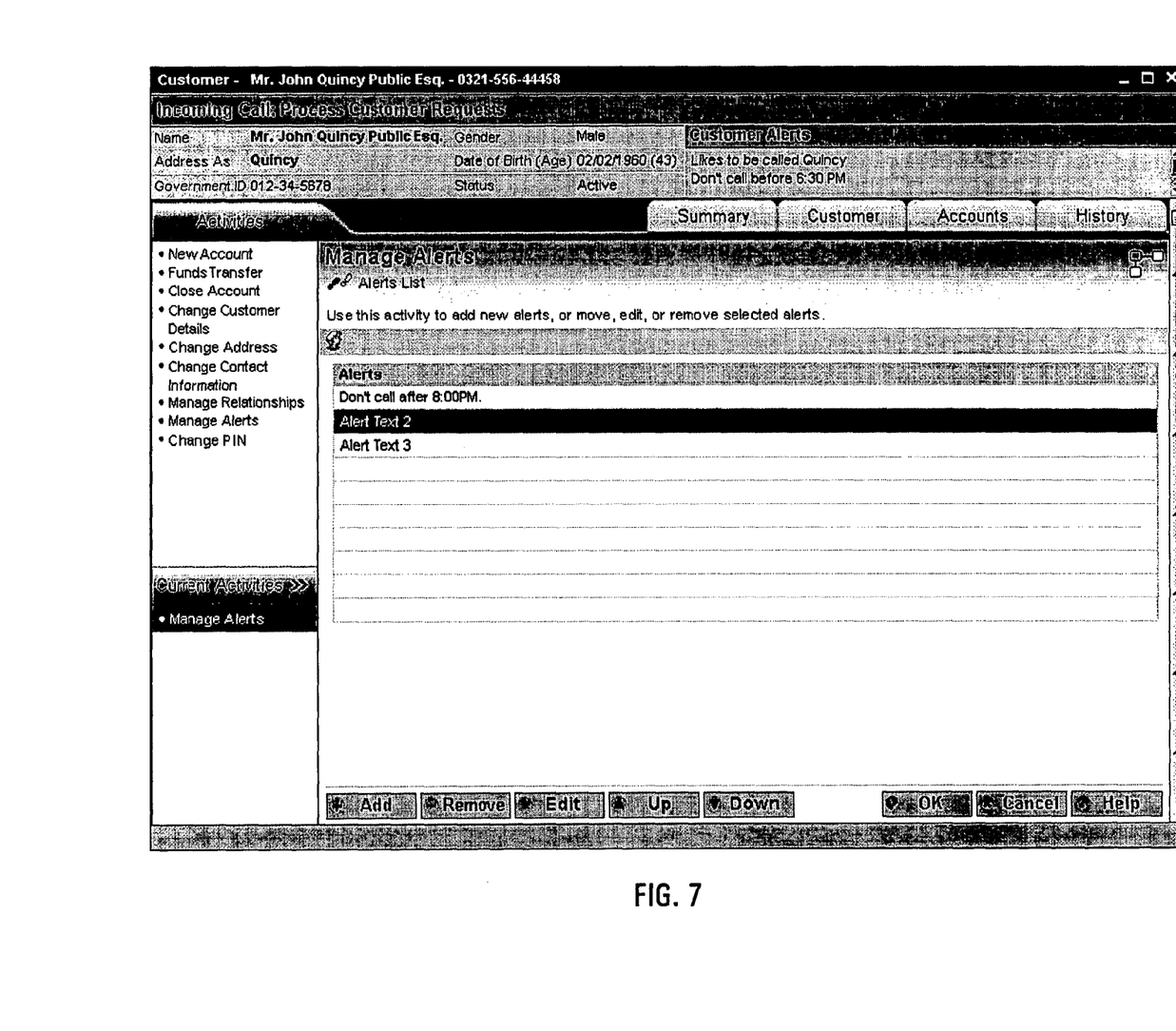
FIG. 7 depicts an exemplary process panel in a customer profile context.

FIGS. 7 and 8 show specific embodiments of the PVI in accordance with the present invention in the context of a customer call center application wherein the process panel 204 and data viewer 208, respectively, are shown in the foreground.

Figure 9:
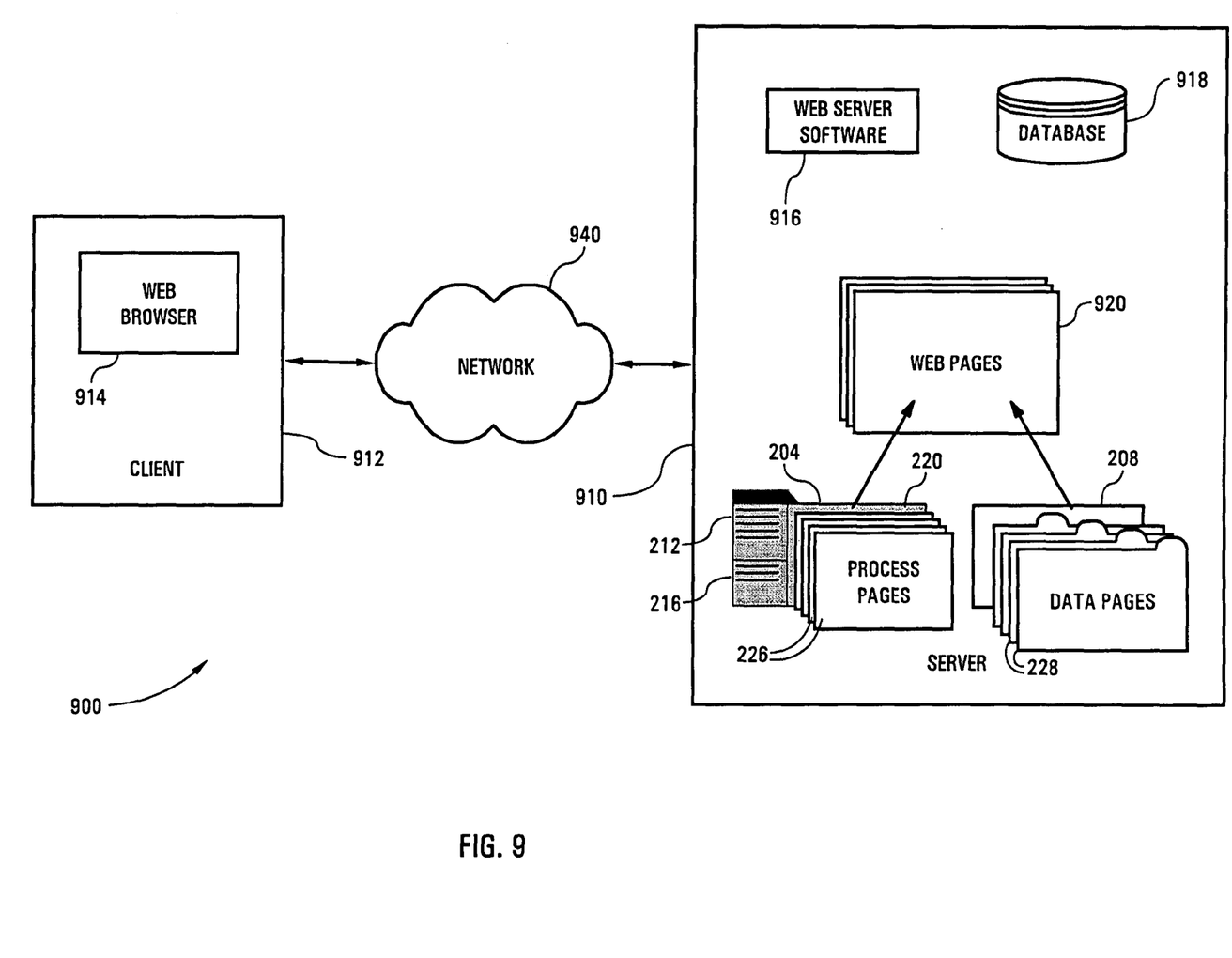
FIG. 9 is a block diagram illustrating a web browser-based embodiment of the present invention.

Referring now to FIG. 9, a block diagram depicting an exemplary networked information handling system 900 in accordance with a preferred, web browser-based embodiment of the present invention is shown. The information handling system 900 includes one or more network servers 910 interconnected with one or more remotely located client computer systems 912 configured to allow a user to use a browser over a network 940. The client computer system 912 and server computer system 910 may be, for example, a computer-based information handling system as described above by way of reference to FIG. 1. The network 940 interconnecting server 910 and the remote client system 912 can include, for example, a local area network (LAN), metropolitan area network (MAN), wide area network (WAN), and the like, and interconnections thereof. Network connection 940 can be an Internet connection made using the World Wide Web, an intranet connection, or the like. Since the PVI of the present invention requires only a single application or document window, it particularly lends itself to thin client web applications.

To retrieve data for a selected object for display and/or processing, the server system 910 operates web server software 916. The server computer system 910 further includes a database or data store 918, which may be a single database or a plurality of separate but linked databases, or alternately, can be one or more database elements, such as tables, data stores, repositories within one or more larger databases, and so forth.

The database 918 contains information for the conceptual objects represented in software. The database 918 may be DBMS-based storage system or the data may come from a non-DBMS based storage system such as object databases, XML files, or data obtained through calls to web services or other persistent or real-time data source. For example, in the case of software for use in connection with a customer call center, data may include, for example, customer name, shipping information, account information, address or other location information, e-mail address, phone numbers, customer profile data, and so forth.

The server computer system 910 and client computer system 912 interact by exchanging information via communications link 940, which may include transmission over the Internet. In the depicted, web browser-based embodiment, the server engine receives hypertext transfer protocol (HTTP) requests to access web pages identified by uniform resource locators (URLs) and provides the requested web pages to the client computer systems for display using the browser 914, as is generally known in the art.

To execute processes and/or view data for a conceptual object represented in software, a user operates client computer system 912. The client computer system 912 operates web browser software 914 that allows the user to download and display one or more web pages 920 contained on the server computer system 910.

Each of the web pages 920 includes a process panel or region 204 and data panel or region 208, arranged in overlapping manner within a common window 200 (see FIG. 2) on the web page 920, and each of which may be selectively brought into view or focus as described above. The process panel includes one or more, and preferably two, process list regions 212 and 216 for display of available and/or currently running processes. The process panel also includes a process display region 220 for the display of one or more process pages 226. The data panel 208 displays one or more data pages 228, displaying data retrieved from the database 918.

In certain embodiments, the PVI of the present invention may be employed in connection with a web application targeted to run in Microsoft's Internet Explorer browser (e.g., version 5.5 or higher), and may be implemented through a combination of web pages and iframes, with JSP and XML used to handle dynamic content.

The PVI could alternately be implemented through the use of standard tables and other W3C HTML 4.0 standard approaches to provide compatibility with web browsers other than IE5.5 and higher. Additionally, the PVI could be implemented in a host of other programming languages (such as Java and C++) and run as a stand alone application or client/server application. Although the PVI architecture is particularly suited for web applications, the PVI design features may also be advantageously used for non-web based applications.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as the auxiliary memory of FIG. 1, for example in a hard disk drive or in a removable memory such as an optical disk for utilization in a DVD-ROM or CD-ROM drive, a magnetic media for utilization in a magnetic media drive, a magneto-optical disk for utilization in a magneto-optical drive, a floptical disk for utilization in a floptical drive, or a memory card for utilization in a card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically, or holographically, so that the medium carries computer readable information.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

The invention claimed is:

1. A user interface for viewing reference data associated with a conceptual entity and for selectively executing multiple complex processes for manipulating said data, comprising:
   a process panel including:
      (a) a process work area for displaying a state of a selected one of said complex processes;
      (b) a first display region displaying a list of all available ones of said multiple complex processes; and
      (c) a second display region for displaying one or both of:
         (i) all currently running ones of said multiple complex processes; and
         (ii) all ones of said multiple complex processes that have been run in a computing session;
   a data viewer comprising a content pane for the display of said reference data and one or more on-screen objects for selectively displaying at least a portion of said reference data;
   a common window framing the process panel and data viewer; and
   said process panel and data viewer being selectably viewable and occupying overlapping positions within said common window, said user interface arranged to display the first display region, the second display region, and the data viewer in contemporaneous and non-overlapping manner when the data viewer is selected, and to display the first display region, the second display region, and the process work area in contemporaneous and non-overlapping manner when the process panel is selected.

2. The user interface of claim 1, wherein the process work area is coextensive with said content pane.

3. The user interface of claim 2, wherein each of said multiple complex processes listed in said first region is selectable to cause one or more of:
   display of a state of a selected complex process in said process work area;
   execution of a selected complex process; and
   queuing of a selected complex process for later execution.

4. The user interface of claim 2, wherein each process listed in said second region is selectable to cause one or both of:
   display of a state of a selected complex process in said process work area; and
   execution of a selected complex process.

5. The user interface of claim 1, wherein said first region and said second region are located adjacent to each other in the process panel.

6. The user interface of claim 1, wherein the process work area is coextensive with said content pane, and further wherein the data viewer includes multiple pages of data, each of said multiple pages selectively displayable within said content pane.

7. The user interface of claim 6, wherein said one or more on-screen objects for selectively displaying at least a portion of said reference data comprise:
   a tab associated with each of said multiple pages of data for displaying a selected one of said multiple pages of data.

8. The user interface of claim 1, wherein the process panel further comprises:
   an on-screen object for the selective display of a default process page in said process work area.

9. The user interface of claim 1, wherein the conceptual entity is a customer.

10. A combined data viewer and data processing system for use with a computer-based information handling system having a display device and that displays on a screen of said display device a user interface for viewing reference data associated with a conceptual entity and for execution of multiple complex processes for manipulating said reference data, said combined data viewer and data processing system comprising:
    a process panel comprising a first region including a list of all available complex processes, a second region for displaying a list of all currently running ones of said complex processes, and a third region comprising a process work area for the display of a state of a selected process and/or receiving user input;
    a data viewer comprising a content pane for the display of data associated with said conceptual entity;
    a common window framing the process panel and the data viewer;
    said process work area and said content pane being selectably viewable and occupying overlapping positions within said common window; and
    said first, second, and third regions being mutually non-overlapping.

11. The combined data viewer and data processing system of claim 10, wherein the process work area and content pane are coextensive.

12. The combined data viewer and data processing system of claim 11, wherein said first region includes, for each of said multiple complex processes that are available for manipulating said reference data, an on-screen object selectable to cause one or more of:
    display of a state of a selected complex process in said process work area;
    execution of a selected complex process; and
    queuing of a selected complex process for later execution.

13. The combined data viewer and data processing system of claim 12, wherein said second region includes, for each of said multiple complex processes that are currently running, an on-screen object selectable to cause one or both of:
    display of a state of a selected complex process in said process work area; and
    execution of a selected complex process.

14. A computer-based information handling system for the display of reference data and multiple complex processes for manipulating said reference data in a single window, said complex processes and reference data associated with a conceptual entity represented in software, comprising:
    a processor for executing a program of instructions on the information handling system;
    a memory coupled to the processor for storing the program of instructions executable by the processor; and
    a display system coupled to the processor;
    wherein the program of instructions configures the information handling system to display a user interface comprising:
      a process panel including:
        (a) a process work area for displaying a state of a selected one of said complex processes;
        (b) a first display region displaying a list of all available ones of said multiple complex processes; and
        (c) a second display region for displaying one or both of:
          (i) all currently running ones of said multiple complex processes; and
          (ii) all ones of said multiple complex processes that have been run in a computing session;
      a data viewer comprising a content pane for the display of said reference data and one or more on-screen objects for selectively displaying at least a portion of said reference data;
      a common window framing the process panel and data viewer; and
      said process panel and data viewer being selectably viewable and occupying overlapping positions within said common window, said user interface arranged to display the first display region, the second display region, and the data viewer in contemporaneous and non-overlapping manner when the data viewer is selected, and to display the first display region, the second display region, and the process work area in contemporaneous and non-overlapping manner when the process panel is selected.

15. A user interface for viewing reference data associated with a conceptual entity and for execution of multiple complex processes for manipulating said data, comprising:
    a process panel including:
      (a) a process work area for displaying a state of a selected one of said complex processes;
      (b) a first display region displaying a list of all available ones of said multiple complex processes; and
      (c) a second display region for displaying one or both of:
        (i) all currently running ones of said multiple complex processes; and
        (ii) all ones of said multiple complex processes that have been run in a computing session;

a data viewer for the display of reference data;
a common window containing said process panel and said data viewer; and
said process panel and data viewer being arranged in an overlapping and individually selectable manner within said common window, said user interface arranged to display the first display region, the second display region, and the data viewer in contemporaneous and non-overlapping manner when the data viewer is selected, and to display the first display region, the second display region, and the process work area in contemporaneous and non-overlapping manner when the process panel is selected.

16. A system for generating a combined process and data viewer interface, comprising:
   a client computer system connected to a network;
   a server computer system connected to the network, the network interconnecting the client computer system and the server computer system; and
   a program of instructions comprising a user interface running on at least one of the server computer system and the client computer system, said user interface comprising:
   a process panel for executing multiple complex processes for manipulating reference data associated with a conceptual entity and displaying a state of said complex processes, said process panel including:
      (a) a process work area for displaying a state of a selected one of said complex processes;
      (b) a first display region displaying a list of all available ones of said multiple complex processes; and
      (c) a second display region for displaying one or both of:
         (i) all currently running ones of said multiple complex processes; and
         (ii) all ones of said multiple complex processes that have been run in a computing session;
   a data viewer for the display of said reference data;
   a common window containing said process panel and said data viewer; and
   said process panel and data viewer being arranged in an overlapping and individually selectable manner within said common window, said user interface arranged to display the first display region, the second display region, and the data viewer in contemporaneous and non-overlapping manner when the data viewer is selected, and to display the first display region, the second display region, and the process work area in contemporaneous and non-overlapping manner when the process panel is selected.

17. The system of claim 16, wherein the user interface comprises one or more interface elements defined using HTML.

18. The system of claim 16, wherein the client computer system comprises a web browser for accessing the network and communicating with the server over the network.

19. The system of claim 16, wherein the server computer system comprises a database containing the reference data.

20. The system of claim 19, wherein said conceptual entity is a customer and said information comprises one or more prestored items associated with the customer.

21. The system of claim 16, wherein the client computer system and the server computer system communicate via the Internet.

22. A method for the display of multiple complex processes and reference data in a single window, said complex processes and reference data associated with a conceptual entity represented in software, said complex processes for manipulating said reference data, comprising:
   opening a common window;
   displaying a process panel within said common window, the process panel including:
      (a) a process work area for displaying a state of a selected one of said complex processes;
      (b) a first display region displaying a list of all available ones of said multiple complex processes; and
      (c) a second display region for displaying one or both of:
         (i) all currently running ones of said multiple complex processes; and
         (ii) all ones of said multiple complex processes that have been run in a computing session;
   displaying a data viewer comprising a content pane for the display of said reference data and one or more on-screen objects for selectively displaying at least a portion of said reference data; and
   said process panel and data viewer being selectably viewable and occupying overlapping positions within said common window, said process panel and data viewer arranged to display the first display region, the second display region, and the data viewer in contemporaneous and non-overlapping manner when the data viewer is selected, and to display the first display region, the second display region, and the process work area in contemporaneous and non-overlapping manner when the process panel is selected.

23. The method of claim 22, wherein the process work area is coextensive with said content pane.

24. The method of claim 22, further comprising:
   in response to a user selection of a selected one of said multiple complex processes in said first region, causing one or more of:
      display of a state of a selected complex process in said process work area;
      execution of a selected complex process; and
      queuing of a selected complex process for later execution.

25. The method of claim 22, further comprising:
   in response to a user selection of a process listed in said second region, causing one or both of:
      display of a state of a selected complex process in said process work area; and
      execution of a selected complex process.

26. The method of claim 22, further comprising:
   defining multiple levels of user access;
   assigning users one of said levels of user access;
   associating each of said complex processes with one or more multiple levels of user access;
   identifying an assigned level of user access for a user; and
   configuring the process panel to allow execution of only complex processes that are associated with an identified level of user access.

27. The method of claim 22, wherein said first region and said second region are located adjacent to each other in the process panel.

28. The method of claim 22, wherein the process work area is coextensive with said content pane, and further wherein the data viewer includes multiple pages of data, each of said multiple pages selectively displayable within said content pane.

29. The method of claim 28, wherein said one or more on-screen objects for selectively displaying at least a portion of said reference data comprise:

a tab associated with each of said multiple pages of data for displaying a selected one of said multiple pages of data.

30. The method of claim 22, wherein the process panel further comprises:
an on-screen object for the selective display of a default process page in said process work area.

31. The method of claim 22, wherein the conceptual entity is a customer.

32. The method of claim 22, further comprising:
dynamically defining a set of available complex processes; and
displaying a representation of said set of available complex processes in said process panel.

33. A computer readable medium whose contents cause a computer to perform method steps for the display of multiple complex processes and reference data in a single window, said complex processes and reference data associated with a conceptual entity represented in software, said complex processes for the manipulation of said reference data, the method steps comprising:
opening a common window;
displaying a process panel within said common window, the process panel including:
(a) a process work area for displaying a state of a selected one of said complex processes;
(b) a first display region displaying a list of all available ones of said multiple complex processes; and
(c) a second display region for displaying one or both of:
(i) all currently running ones of said multiple complex processes; and
(ii) all ones of said multiple complex processes that have been run in a computing session;
displaying a data viewer comprising a content pane for the display of said reference data and one or more on-screen objects for selectively displaying at least a portion of said reference data; and
said process panel and data viewer being selectably viewable and occupying overlapping positions within said common window, said process panel and data viewer arranged to display the first display region, the second display region, and the data viewer in contemporaneous and non-overlapping manner when the data viewer is selected, and to display the first display region, the second display region, and the process work area in contemporaneous and non-overlapping manner when the process panel is selected.

* * * * *